United States Patent
Kim et al.

(10) Patent No.: US 9,997,804 B2
(45) Date of Patent: Jun. 12, 2018

(54) ELECTROLYTE FOR LITHIUM SECONDARY BATTERY AND LITHIUM SECONDARY BATTERY INCLUDING THE SAME

(71) Applicant: SAMSUNG SDI CO., LTD., Yongin-si, Gyeonggi-do (KR)

(72) Inventors: Jin Sung Kim, Yongin-si (KR); Ha Young Lee, Yongin-si (KR); Jinbum Kim, Yongin-si (KR); Yongshik Kim, Yongin-si (KR); Narae Park, Yongin-si (KR); Myungkuk Patk, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 455 days.

(21) Appl. No.: 14/219,979

(22) Filed: Mar. 19, 2014

(65) Prior Publication Data
US 2014/0205915 A1 Jul. 24, 2014

Related U.S. Application Data

(62) Division of application No. 11/505,953, filed on Aug. 18, 2006, now Pat. No. 8,715,852.

(30) Foreign Application Priority Data

Aug. 18, 2005 (KR) .................. 10-2005-0075685
Jan. 9, 2006 (KR) .................. 10-2006-0002439

(51) Int. Cl.
*H01M 10/056* (2010.01)
*H01M 10/0567* (2010.01)
(Continued)

(52) U.S. Cl.
CPC ....... *H01M 10/0567* (2013.01); *H01M 4/505* (2013.01); *H01M 4/525* (2013.01);
(Continued)

(58) Field of Classification Search
CPC ........ H01M 4/50; H01M 4/131; H01M 4/133; H01M 4/405; H01M 4/587;
(Continued)

(56) References Cited

U.S. PATENT DOCUMENTS 5,296,319 A 3/1994 Bito et al.
5,352,548 A 10/1994 Fujimoto et al.
(Continued)

FOREIGN PATENT DOCUMENTS

EP 1403957 * 3/2004 ............ H01M 10/40
JP 2001-006729 1/2001
(Continued)

OTHER PUBLICATIONS

English translation of Japanese Publication JP 2005-050707 listed above.

*Primary Examiner* — Jonathan Crepeau
*Assistant Examiner* — Angela Martin
(74) *Attorney, Agent, or Firm* — Lewis Roca Rothgerber Christie LLP

(57) ABSTRACT

An electrolyte for a lithium secondary battery and a lithium secondary battery including the same are provided. The electrolyte includes a non-aqueous organic solvent, lithium salt, and an additive that is either a dicarboxylic acid anhydride and a halogenated ethylene carbonate or a diglycolic acid anhydride and a halogenated ethylene carbonate.

21 Claims, 5 Drawing Sheets

(51) Int. Cl.
H01M 4/505 (2010.01)
H01M 4/525 (2010.01)
H01M 10/0525 (2010.01)
H01M 10/0569 (2010.01)
H01M 4/131 (2010.01)
H01M 4/133 (2010.01)
H01M 4/40 (2006.01)
H01M 4/587 (2010.01)

(52) U.S. Cl.
CPC ... H01M 10/0525 (2013.01); H01M 10/0569 (2013.01); *H01M 4/131* (2013.01); *H01M 4/133* (2013.01); *H01M 4/405* (2013.01); *H01M 4/587* (2013.01); *H01M 2300/0025* (2013.01)

(58) Field of Classification Search
CPC ......... H01M 10/0525; H01M 10/0567; H01M 10/0569; H01M 2300/0025
See application file for complete search history.

(56) References Cited

U.S. PATENT DOCUMENTS

| | | | |
|---|---|---|---|
| 5,712,059 A | 1/1998 | Barker et al. | |
| 5,714,281 A | 2/1998 | Naruse et al. | |
| 6,048,637 A | 4/2000 | Tsukahara et al. | |
| 6,114,070 A | 9/2000 | Yoshida et al. | |
| 7,691,537 B2* | 4/2010 | Kim | H01M 10/0525 252/62.2 |
| 8,551,662 B2* | 10/2013 | Onuki | H01M 10/0525 252/364 |
| 2004/0146786 A1* | 7/2004 | Sato | H01G 9/038 429/326 |
| 2004/0197667 A1* | 10/2004 | Noh | H01M 10/0525 429/326 |
| 2005/0118512 A1* | 6/2005 | Onuki | H01M 6/168 429/326 |
| 2005/0164094 A1* | 7/2005 | Kotato | H01M 10/0525 429/331 |
| 2006/0115739 A1* | 6/2006 | Yamaguchi | H01M 4/38 429/326 |
| 2007/0048607 A1* | 3/2007 | Nakashima | H01M 2/166 429/209 |
| 2008/0241702 A1* | 10/2008 | Takahashi | H01B 1/24 429/332 |

FOREIGN PATENT DOCUMENTS

| | | | | |
|---|---|---|---|---|
| JP | 2005-050707 | | 2/2005 | |
| KR | 10-2004-00595 A | | 1/2004 | |
| KR | 10-2004-0083670 A | | 10/2004 | |
| KR | 1020040083670 | * | 10/2004 | ............ H01M 10/40 |
| KR | 10-2005-008446 A | | 1/2005 | |
| KR | 102005008446 | * | 1/2005 | ............ H01M 10/40 |
| KR | 10-2006-0041429 A | | 5/2006 | |
| WO | WO 02/093679 | | 11/2002 | |

* cited by examiner

Room Temp. Cycle Life

Room Temp. Cycle Life

60°C Cycle Life

FIG. 5

ROOM TEMPERATURE LIFE %

| NYMBER OF CYCLES | COMPARATIVE EXAMPLE 1a | COMPARATIVE EXAMPLE 2a | COMPARATIVE EXAMPLE 5a | COMPARATIVE EXAMPLE 6a | EXAMPLE 3a |
|---|---|---|---|---|---|
| 1 | 90% | 99% | 98% | 99% | 98% |
| 10 | 89% | 96% | 95% | 95% | 94% |
| 20 | 89% | 94% | 93% | 93% | 93% |
| 30 | 88% | 93% | 93% | 92% | 93% |
| 40 | 88% | 93% | 92% | 92% | 92% |
| 50 | 88% | 92% | 91% | 91% | 92% |
| 60 | 88% | 92% | 91% | 90% | 91% |
| 70 | 88% | 91% | 91% | 90% | 91% |
| 80 | 88% | 90% | 90% | 89% | 90% |
| 90 | 88% | 90% | 90% | 89% | 90% |
| 100 | 88% | 90% | 89% | 89% | 90% |
| 110 | 87% | 89% | 89% | 88% | 89% |
| 120 | 87% | 89% | 88% | 88% | 89% |
| 130 | 87% | 88% | 88% | 88% | 89% |
| 140 | 87% | 88% | 88% | 88% | 89% |
| 150 | 87% | 88% | 88% | 87% | 88% |
| 160 | 87% | 87% | 87% | 87% | 88% |
| 170 | 86% | 87% | 87% | 87% | 88% |
| 180 | 86% | 86% | 87% | 87% | 88% |
| 190 | 86% | 86% | 86% | 87% | 88% |
| 200 | 86% | 85% | 86% | 86% | 87% |
| 210 | 85% | 85% | 86% | 86% | 87% |
| 220 | 85% | 85% | 85% | 86% | 87% |
| 230 | 85% | 84% | 85% | 86% | 87% |
| 240 | 84% | 84% | 85% | 85% | 87% |
| 250 | 84% | 83% | 84% | 85% | 87% |
| 260 | 83% | 82% | 84% | 85% | 86% |
| 270 | 82% | 80% | 84% | 85% | 86% |
| 280 | 81% | 79% | 83% | 84% | 86% |
| 290 | 79% | 77% | 81% | 84% | 86% |
| 300 | 77% | 74% | 80% | 83% | 86% |
| 310 | 0% | 0% | 79% | 83% | 86% |
| 320 | 0% | 0% | 78% | 83% | 85% |
| 330 | 0% | 0% | 77% | 82% | 85% |
| 340 | 0% | 0% | 75% | 81% | 85% |
| 350 | 0% | 0% | 74% | 80% | 85% |
| 360 | 0% | 0% | 0% | 79% | 85% |
| 370 | 0% | 0% | 0% | 78% | 85% |
| 380 | 0% | 0% | 0% | 76% | 85% |
| 390 | 0% | 0% | 0% | 74% | 84% |
| 400 | 0% | 0% | 0% | 71% | 84% |
| 410 | 0% | 0% | 0% | 0% | 85% |
| 420 | 0% | 0% | 0% | 0% | 84% |
| 430 | 0% | 0% | 0% | 0% | 84% |
| 440 | 0% | 0% | 0% | 0% | 84% |
| 450 | 0% | 0% | 0% | 0% | 83% |
| 460 | 0% | 0% | 0% | 0% | 83% |
| 470 | 0% | 0% | 0% | 0% | 82% |
| 480 | 0% | 0% | 0% | 0% | 82% |
| 490 | 0% | 0% | 0% | 0% | 81% |
| 500 | 0% | 0% | 0% | 0% | 81% |

ROOM TEMPERATURE CYCLE LIFE

ROOM TEMPERATURE CYCLE LIFE

ELECTROLYTE FOR LITHIUM SECONDARY BATTERY AND LITHIUM SECONDARY BATTERY INCLUDING THE SAME

CROSS-REFERENCE TO RELATED APPLICATIONS

This application is a divisional of U.S. application Ser. No. 11/505,953, filed on Aug. 18, 2006, entitled "ELECTROLYTE FOR LITHIUM SECONDARY BATTERY AND LITHIUM SECONDARY BATTERY INCLUDING THE SAME," which claims priority to and the benefit of Korean Patent Application Nos. 10-2005-75685, filed on Aug. 18, 2005, and 10-2006-2439, filed on Jan. 9, 2006 in the Korean Intellectual Property Office, the disclosures of all of which are incorporated herein by reference.

BACKGROUND OF THE INVENTION

1. Field of the Invention

Aspects of the present invention relate to an electrolyte for a lithium secondary battery and a lithium secondary battery including the same. More particularly, aspects of the present invention relate to an electrolyte for a lithium secondary battery that has a long life and that is preserved well and a lithium secondary battery including the same.

2. Description of the Related Art

Recently, as apparatuses such as camcorders, mobile telephones, and notebook personal computers (PC) become smaller and lighter and have higher performances due to the rapid developments of electronic industry, communication industry, and computer industry and electronic products, light and reliable batteries that can be used for a long time are required. In particular, since a rechargeable lithium secondary battery has an energy density per unit weight that is three times higher than the energy densities per unit weight of a conventional lead battery, a conventional Ni—Cd battery, a conventional Ni—H battery, and a conventional Ni—Zn battery and can be rapidly charged, research and development on the rechargeable lithium secondary battery has actively performed worldwide.

Lithium metal oxides are used as the positive electrode active materials of a lithium secondary battery. A lithium metal, a lithium alloy, (crystalline or amorphous) carbon, and a carbon composite are used as the negative electrode active materials of a lithium secondary battery. The term "lithium secondary battery" may refer to a lithium ion battery, a lithium ion polymer battery, or a lithium polymer battery in accordance with the kind of separator and electrolyte that are used. A lithium secondary battery may be a cylinder type battery, a polygon type battery, a coin type battery or other types in accordance with the shape thereof.

The average discharge voltage of the lithium secondary battery is in the range of from 3.6V to 3.7V, which is higher than the discharge voltages of other alkali batteries such as a Ni-MH battery, or a Ni—Cd battery. However, in order to obtain such a high driving voltage, the electrolyte composition used in the battery should be electrochemically stable in the range of from 0V to 4.2V, which is the charge and discharge voltage region. Therefore, an organic electrolyte obtained by dissolving lithium salt in a non-aqueous organic solvent is used as an electrolyte for a lithium secondary battery. An organic solvent having high ion conductivity and dielectric constant and low viscosity is preferably used as the organic solvent. However, since the single non-aqueous organic solvent that satisfies all of the above-described conditions has not yet been found, a solvent obtained by mixing together an organic solvent of a high dielectric constant and an organic solvent of a low dielectric constant or a solvent obtained by mixing together an organic solvent of a high dielectric constant and an organic solvent of low viscosity may be used.

A method of improving the ion conductivity of an organic solvent obtained by mixing together a chain carbonate such as dimethyl carbonate or diethyl carbonate and a cyclic carbonate such as ethylene carbonate or propylene carbonate is disclosed in U.S. Pat. Nos. 6,114,070 and 6,048,637. However, this organic solvent mixture cannot be used at a temperature higher than 120° C. since a gas may be generated by steam pressure at such temperatures such that the battery may swell.

An electrolyte including an organic solvent including at least 20% of vinylene carbonate (VC) is disclosed in U.S. Pat. Nos. 5,352,548, 5,712,059, and 5,714,281. However, since the dielectric constant of vinylene carbonate is smaller than the dielectric constants of ethylene carbonate, propylene carbonate and gamma-butyrolactone, when the vinylene carbonate is used as a main solvent, the charge and discharge characteristics and the high rate characteristic of the battery significantly deteriorate.

On the other hand, in order to suppress the reductive decomposition of a solvent on a negative electrode, a method of adding a compound that forms a solid electrolyte interface (SEI) on a negative electrode to an electrolyte as a means of suppressing the reductive decomposition of lithium on the negative electrode is disclosed in Japanese Patent Publication No. hei 2001-6729. However, when such a film forming additive is used, since a high resistance SEI in which the conductivity of lithium ions is low is formed on the negative electrode, the discharge characteristic of a battery significantly deteriorates. If an excessive amount of film forming additive is added to the electrolyte, when the excessive amount of film forming additive is preserved at a high temperature, the film forming additive may oxidize and disintegrate on a positive electrode to generate a gas so that the battery may significantly swell due to the increase in internal pressure.

SUMMARY OF THE INVENTION

Aspects of the present invention provide an electrolyte for a lithium secondary battery that is well preserved at high and low temperatures and that has a long life.

Aspects of the present invention further provide a lithium secondary battery including the electrolyte.

According to an aspect of the present invention, there is provided an electrolyte for a lithium secondary battery including a non-aqueous organic solvent, lithium salt, and a dicarboxylic acid anhydride and a halogenated ethylene carbonate as additives.

Also, there is provided a lithium secondary battery including an electrolyte including a non-aqueous organic solvent, lithium salt, and dicarboxylic acid anhydride and halogenated ethylene carbonate as additives, a positive electrode including positive electrode active materials into which lithium ions can be inserted and from which the lithium ions can be separated, and a negative electrode including negative electrode active materials into which lithium ions can be inserted and from which the lithium ions can be separated.

Also, there is provided an electrolyte for a lithium secondary battery including a non-aqueous organic solvent, lithium salt, and diglycolic acid anhydride that is substituted or that is not substituted and halogenated ethylene carbonate as additives. The amount of the diglycolic acid anhydride that is substituted or that is not substituted is in the range of from 0.1 wt % to 2 wt % based on the weight of the non-aqueous organic solvent. The amount of the halogenated ethylene carbonate may be in the range of from 0.1 wt % to 10 wt % based on the weight of the non-aqueous organic solvent.

Also, there is provided a lithium secondary battery including the electrolyte manufactured according to the embodiment of the present invention, a positive electrode including positive electrode active materials into which lithium ions can be inserted and from which the lithium ions can be separated, and a negative electrode including negative electrode active materials into which lithium ions can be inserted and from which the lithium ions can be separated.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 5 is a table illustrating room temperature cycle lives of lithium secondary batteries manufactured using electrolytes according to example 3a of the second embodiment of the present invention and comparative examples 1a, 2a, 5a, and 6a; and FIGS. 6A and 6B are graphs illustrating room temperature cycle lives of polygon type lithium secondary batteries manufactured using electrolytes according to example 3a of the second embodiment of the present invention and comparative examples 1a, 2a, 5a, and 6a.

DETAILED DESCRIPTION OF THE EMBODIMENTS

Figure 1:
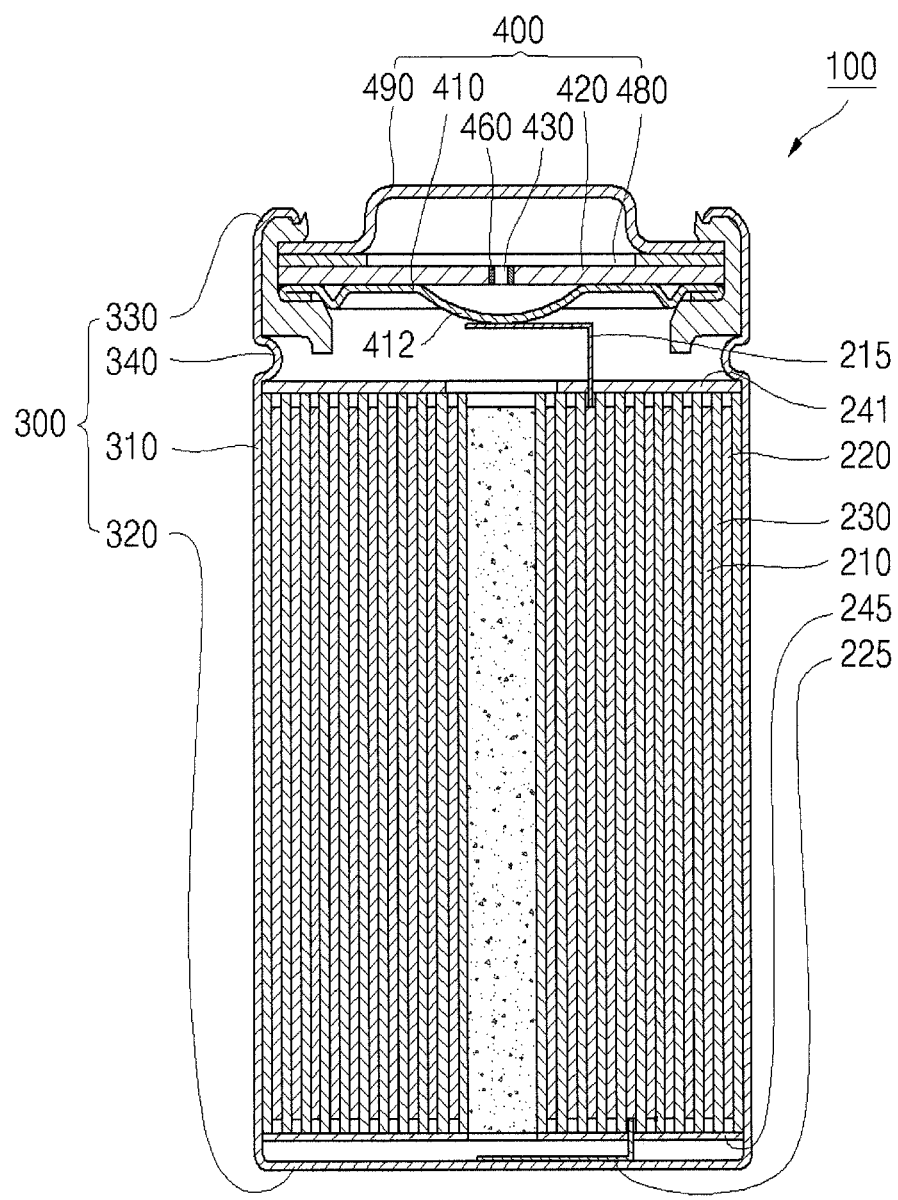
FIG. 1 is a sectional view of a cylinder type lithium secondary battery.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

An electrolyte according to a first embodiment of the present invention includes a dicarboxylic acid anhydride and a halogenated ethylene carbonate as additives. The electrolyte includes a mixture of the dicarboxylic acid anhydride and the halogenated ethylene carbonate to increase the life of the battery and to well preserve the battery.

Succinic acid anhydride, maleic acid anhydride, glutaric acid anhydride, itaconic acid anhydride, and mixtures of the above-described anhydrides may be used as the dicarboxylic acid anhydride. As a specific, non-limiting example, succinic acid anhydride may be used to increase the life of the battery.

At least one compound of Chemical Formula 1 may be used as the halogenated ethylene carbonate. As a specific, non-limiting example, fluoroethylene carbonate may be used as the halogenated ethylene carbonate.

[Chemical Formula 1]

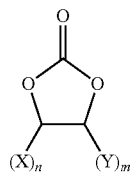

wherein, X represents a halogen atom, Y represents a hydrogen or halogen atom, and n and m represent 1 or 2.

The amount of the dicarboxylic acid anhydride may be in the range of from 0.1 wt % to 2 wt % based on the weight of the non-aqueous organic solvent (described later). The amount of the halogenated ethylene carbonate may be in the range of from 0.1 wt % to 10 wt % based on the weight of the non-aqueous organic solvent. The dicarboxylic acid anhydride and the halogenated ethylene carbonate in the above-described ranges should be mixed with each other to increase the life of the battery and to well preserve the battery. When only the dicarboxylic acid anhydride is included in the electrolyte, the battery is not well preserved at a low temperature. When only the halogenated ethylene carbonate is included in the electrolyte, the life of the battery is reduced.

It is to be understood that when "a dicarboxylic acid anhydride" and "a halogenated ethylene carbonate" are mentioned herein, more than one dicarboxylic acid anhydride and/or more than one halogenated ethylene carbonate can be present. In such a case, the total amount of the dicarboxylic acid anhydrides and the total amount of the halogenated ethylene carbonates should be within the above ranges.

An electrolyte according to a second embodiment of the present invention includes a substituted or unsubstituted diglycolic acid anhydride and a halogenated ethylene carbonate as additives. The diglycolic acid anhydride can be substituted by at least one substituent selected from the group consisting of halogen, an alkyl group including from 1 to 10 carbon atoms, an alkene group, and an acyl group. The electrolyte includes a mixture of the diglycolic acid anhydride and the halogenated ethylene carbonate to increase the life of the battery and to well preserve the battery.

The amount of the substituted or unsubstituted diglycolic acid anhydride may be in the range of from 0.1 wt % to 2 wt % based on the weight of the non-aqueous organic solvent (described later). The amount of the halogenated ethylene carbonate may be in the range of from 0.1 wt % to 10 wt % based on the weight of the non-aqueous organic solvent. The battery can have a long life and can be well preserved when the diglycolic acid anhydride and the halogenated ethylene carbonate in the above-described ranges are mixed with each other. When only the diglycolic acid anhydride is included in the electrolyte, the battery is not well preserved at a low temperature. When only the halogenated ethylene carbonate is included in the electrolyte, the life of the battery is reduced.

The compound of Chemical Formula 1 may be used as the halogenated ethylene carbonate in the electrolyte of the second embodiment. As a specific, non-limiting example, fluoroethylene carbonate may be used as the halogenated ethylene carbonate.

It is to be understood that when "a diglycolic acid anhydride" and "a halogenated ethylene carbonate" are mentioned herein, more than one diglycolic acid anhydride and/or more than one halogenated ethylene carbonate can be present. In such a case, the total amount of the diglycolic acid anhydrides and the total amount of the halogenated ethylene carbonates should be within the above ranges.

The electrolyte according to either the first embodiment or the second embodiment includes a non-aqueous organic solvent and lithium salt. The lithium salt serves as a source of supply of lithium ions in the battery to enable the lithium battery to basically operate. The non-aqueous organic solvent serves as a medium through which the ions that participate in the electrochemical reaction of the battery move.

As non-limiting examples, one or a mixture of at least two selected from the group consisting of $LiPF_6$, $LiBF_4$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlO_4$, $LiAlCl_4$, LiCl, and LiI may be used as the lithium salt. As specific, non-limiting examples, the concentration of the lithium salt may be in the range of from 0.6M to 2.0M, and more particularly, may be in the range of from 0.7M to 1.6M. When the concentration of the lithium salt is less than 0.6M, the conductivity of the electrolyte is reduced, which deteriorates the performance of the electrolyte. When the concentration of the lithium salt is greater than 2.0M, the viscosity of the electrolyte increases so that the mobility of the lithium ions is reduced.

Carbonate, ester, ether, ketone, and mixtures of the above-described organic compounds may be used as the non-aqueous organic solvent. The organic solvent should have a large dielectric constant (polarity) and low viscosity in order to increase the degree of dissociation and the conductivity of ions. As non-limiting examples, at least two mixtures of a solvent having a high dielectric constant and high viscosity and a solvent having a low dielectric constant and low viscosity may be used as the organic solvent.

In the non-aqueous organic solvent, as a non-limiting example, a mixture of a cyclic carbonate and a chain carbonate may be used as a carbonate-based solvent. In this case, as a non-limiting example, the cyclic carbonate and the chain carbonate may be mixed with each other in a volumetric ratio of from 1:1 to 1:9, and more particularly, in a volumetric ratio of from 1:1.5 to 1:4. To obtain a high performance electrolyte, the cyclic carbonate and the chain carbonate may be mixed with each other in the above-described volumetric ratio.

As non-limiting examples, ethylene carbonate (EC), propylene carbonate (PC), 1,2-butylene carbonate, 2,3-butylene carbonate, 1,2-pentylene carbonate, and 2,3-pentylene carbonate may be used as the cyclic carbonate. The dielectric constants of ethylene carbonate and propylene carbonate are high. As a specific, non-limiting example, ethylene carbonate may be used as the cyclic carbonate when artificial graphite is used as a negative electrode active material. As non-limiting examples, dimethyl carbonate (DMC), diethyl carbonate (DEC), dipropyl carbonate (DPC), methylpropyl carbonate (MPC), ethylmethyl carbonate (EMC), and ethylpropyl carbonate (EPC) may be used as the chain carbonate. Among the above-described carbonates, as specific, non-limiting examples, dimethyl carbonate, ethylmethyl carbonate, and diethyl carbonate have low viscosity and may be used as the chain carbonate. Other carbonates may be used.

As non-limiting examples, methyl acetate, ethyl acetate, propyl acetate, methyl propionate, ethyl propionate, γ-butyrolactone, γ-valerolactone, γ-caprolactone, δ-valerolactone, and ε-caprolactone may be used as the ester. As non-limiting examples, tetrahydrofuran, 2-methyltetrahydrofuran, and dibutylether may be used as the ether. As a non-limiting example, polymethylvinyl ketone may be used as the ketone.

An aromatic hydrocarbon-based organic solvent may be further added to the carbonate-based solvent to obtain the electrolyte. The aromatic hydrocarbon-based compound of Chemical Formula 2 may be used as the aromatic hydrocarbon-based organic solvent.

[Chemical Formula 2]

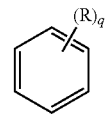

wherein R represents halogen or an alkyl group including from 1 to 10 carbon atoms and q represents an integer from 0 to 6.

As non-limiting examples, benzene, fluorobenzene, bromobenzene, chlorobenzene, toluene, xylene, mesitylene, and mixtures of the above-described organic compounds may be used as the aromatic hydrocarbon-based organic solvent. In the electrolyte including the aromatic hydrocarbon-based organic solvent, the carbonate-based solvent and the aromatic hydrocarbon-based organic solvent may be mixed with each other in a volumetric ratio, for example, of from 1:1 to 30:1. A high performance electrolyte can be obtained when the carbonate-based solvent and the aromatic hydrocarbon-based organic solvent are mixed with each other in the above-described volumetric ratio.

The lithium secondary battery including the electrolyte according to the first embodiment or the electrolyte according to the second embodiment includes a positive electrode and a negative electrode.

The positive electrode includes positive electrode active materials into which lithium ions can be inserted and from which lithium ions can be separated. As non-limiting examples, at least one selected from the group consisting of Co, Mn, and Ni and at least one selected from lithium including mixed oxides may be used as the positive electrode active materials. As specific, non-limiting examples, the following lithium compounds may be used.

 (1)

 (2)

 (3)

 (4)

 (5)

 (6)

 (7)

$$Li_xNi_{1-y}M_yO_{2-z}X_z \quad (8)$$

$$Li_xNi_{1-y}Co_yO_{2-z}X_z \quad (9)$$

$$Li_xNi_{1-y-z}Co_yM_zA_\alpha \quad (10)$$

$$Li_xNi_{1-y-z}Co_yM_zO_{2-\alpha}X_\alpha \quad (11)$$

$$Li_xNi_{1-y-z}Mn_yM_zA_\alpha \quad (12)$$

$$Li_xNi_{1-y-z}Mn_yM_zO_{2-\alpha}X_\alpha \quad (13)$$

wherein, $0.9 \leq x \leq 1.1$, and $0 \leq y \leq 0.5$, $0 \leq z \leq 0.5$, and $0 \leq \alpha \leq 2$ are equal to each other or different from each other and are selected from the group consisting of Mg, Al, Co, K, Na, Ca, Si, Ti, Sn, V, Ge, Ga, B, As, Zr, Mn, Cr, Fe, Sr, V, and rare earth elements, A is selected from the group consisting of O, F, S, and P, and X is selected from the group consisting of F, S, and P.

The negative electrode includes negative electrode active materials into which lithium ions can be inserted and from which lithium ions can be separated. As non-limiting examples, carbon materials such as crystalline carbon, amorphous carbon, a carbon composite, carbon fiber, a lithium metal, and a lithium alloy may be used as the negative electrode active materials. For example, hard carbon, coke, mesocarbon microbead (MCMB) annealed at a temperature no more than 1,500° C., and mesophase pitch-based carbon fiber (MPCF) may be used as the amorphous carbon. Graphite-based materials such as natural graphite, graphitized coke, graphitized MCMB, and graphitized MPCF may be used as the crystalline carbon. As a specific, non-limiting example, a material in which an interplanar distance d002 is in the range of from 3.35 Å to 3.38 Å and in which a crystallite size Lc caused by X-ray diffraction is no less than 20 nm may be used as the carbon material. As non-limiting examples, alloys of lithium and Al, Zn, Bi, Cd, Sb, Si, Pb, Sn, Ga, or In may be used as the lithium alloy.

Electrode active materials, a binder, and a conductive agent and, if necessary, a thickener are dispersed into a solvent to obtain an electrode slurry composition and an electrode collector is coated with the electrode slurry composition so that the positive electrode or the negative electrode is manufactured. As non-limiting examples, Al or an Al alloy may be used as a positive electrode collector and Cu or a Cu alloy may be used as a negative electrode collector. A foil, a film, a sheet, a punched material, a porous material, or a foam may be used as the positive electrode collector and the negative electrode collector.

The binder converts the active materials into a paste, adheres the active materials to each other, adheres the active materials to the collector, and buffers the expansion and contraction of the active materials. As non-limiting examples, polyvinylidenefluoride, copolymer of polyhexafluoropropylene-polyvinylidenefluoride (P(VdF/HFP)), poly(vinylacetate), polyvinylalcohol, polyethyleneoxide, polyvinylpyrrolidone, alkylated polyethyleneoxide, polyvinylether, poly(methylmethacrylate), poly(ethylacrylate), polytetrafluoroethylene, polyvinylchloride, polyacrylonitrile, polyvinylpyridine, styrene-butadiene rubber, or acrylonitrile-butadiene rubber may be used as the binder. As non-limiting examples, the amount of the binder may be in the range of from 0.1 wt % to 30 wt % based on the weight of the electrode active materials, and more particularly, may be in the range of from 1 wt % to 10 wt %. When the amount of the binder is too small, the adhesive strength between the electrode active materials and the collector deteriorates. When the amount of the binder is too large, the adhesive strength between the electrode active materials and the collector improves, but the amount of the electrode active materials is reduced so that it is disadvantageous to increasing the capacity of the battery.

The conductive agent improves electronic conductivity and may be formed, for example, of at least one selected from the group consisting of a graphite-based conductive agent, a carbon black-based conductive agent, and a metal-based or metal compound-based conductive agent. Artificial graphite and natural graphite may be used as the graphite-based conductive agent. Acetylene black, ketjen black, denka black, thermal black, and channel black may be used as the carbon black-based conductive agent. Perovskite materials such as Sn, $SnO_2$, $SnPO_4$, $TiO_2$, $KTiO_3$, $LaSrCoO_3$, and $LaSrMnO_3$ may be used as the metal-based or metal compound-based conductive agent. However, the conductive agent according to the present invention is not limited to the above-described conductive agents. As a non-limiting example, the amount of the conductive agent may be in the range of from 0.1 wt % to 10 wt % based on the weight of the electrode active materials. When the amount of the conductive agent is smaller than 0.1 wt %, the electrochemical property of the battery deteriorates. When the amount of the conductive agent is larger than 10 wt %, the energy density per weight of the battery is reduced.

Any materials that can control the viscosity of the active material slurry may be used as the thickener. For example, carboxymethyl cellulose, hydroxymethyl cellulose, hydroxyethyl cellulose, and hydroxypropyl cellulose may be used as the thickener.

A non-aqueous solvent or an aqueous solvent may be used as the solvent into which the electrode active materials, the binder, and the conductive agent are dispersed. As non-limiting examples, N-methyl-2-pyrrolidone (NMP), dimethylformamide, dimethylacetamide, N,N-dimethylaminopropylamine, ethyleneoxide, and tetrahydrofuran may be used as the non-aqueous solvent into which the electrode active materials, the binder, and the conductive agent are dispersed.

The lithium secondary battery may include a separator for preventing the positive electrode and the negative electrode from being shorted and for providing a path through which the lithium ions move. As non-limiting examples, polyolefin-based polymer layers such as polypropylene, polyethylene, polyethylene/polypropylene, polyethylene/polypropylene/polyethylene, and polypropylene/polyethylene/polypropylene, multi-layers of the above-described polyolefin-based polymer layers, a fine porous film, fabric cloth, and non-woven fabric may be used as the separator. Also, a film obtained by coating a porous polyolefin film with a stable resin may be used as the separator.

FIG. 1 is a sectional view of a cylinder type lithium secondary battery that can include an electrolyte of the first embodiment or an electrolyte according to the second embodiment according to aspects of the present invention.

Referring to FIG. 1, the cylinder type lithium secondary battery 100 includes an electrode assembly 200, a cylinder type can 300 that accommodates the electrode assembly 200 and an electrolyte, and a cap assembly 400 assembled on the top of the cylinder type can 300 to seal up the cylinder type can 300 and to allow the current generated by the electrode assembly 200 to flow to an external apparatus.

In the electrode assembly 200, a positive electrode plate 210 obtained by coating the surface of a positive electrode collector with a positive electrode coating portion, a negative electrode plate 220 obtained by coating the surface of a negative electrode collector with a negative electrode coating portion, a separator 230 interposed between the positive electrode plate 210 and the negative electrode plate 220 to electrically insulate the positive electrode plate 210 and the negative electrode plate 220 from each other are wound in the form of a jelly-roll. The positive electrode plate 210 is typically formed of Al. A positive electrode tab 215 that protrudes upward from the electrode assembly 200 by a predetermined length is connected to one end of the positive electrode collector. The negative electrode plate 220 includes the negative electrode collector formed of a conductive metal thin plate such as a Cu or Ni foil and the negative electrode coating portion with which the both surfaces of the negative electrode plate 220 are coated. The negative electrode plate 220 is typically formed of Ni. A negative electrode tab 225 that protrudes downward from the electrode assembly 200 by a predetermined length is connected to one end of the negative electrode collector. The negative electrode tab 225 may also be formed to protrude upward and to thus be connected to the cylinder type can 300. Insulation plates 241 and 245 for preventing the electrode assembly 200 from being connected to the cap assembly 400 or the cylinder type can 300 may be further provided on the top and bottom of the electrode assembly 200.

The cylinder type can 300 includes a cylinder type side plate 310 having a predetermined diameter so that a predetermined space in which the cylinder type electrode assembly 200 can be accommodated is formed and a bottom plate 320 that seals up the bottom of the cylinder type side plate 310. The top of the cylinder type side plate 310 is opened so that the electrode assembly 200 is inserted. The negative electrode tab 225 of the electrode assembly 200 is connected to the center of the bottom plate 320 of the cylinder type can 300 so that the cylinder type can 300 serves as a negative electrode. A clipping unit 330 curved inward in the upper end thereof to press the top of the cap assembly 400 coupled with the opening on the top of the cylinder type can 300 is formed in the cylinder type can 300. A beading unit 340 recessed inward to press the bottom of the cap assembly 400 is further formed in the cylinder type can 300 in the position separated downward from the clipping unit 330 by the distance corresponding to the thickness of the cap assembly 400. The cylinder type can 300 is typically formed of Al, Fe, or an alloy of Al and Fe.

The cap assembly 400 includes a safety vent 410, a current intercepting unit 420, a secondary protective element 480, and a cap up or cap cover 490.

The safety vent 410 is formed of a conductive metal material in the form of a circular plate that includes a protrusion 412 that protrudes downward in the center thereof and is positioned in the bottom of the cap assembly 400. The positive electrode tab 215 is electrically connected to the bottom of the safety vent 410 and is preferably welded to the protrusion 412. The protrusion 412 of the safety vent 410 is formed to protrude downward in a normal state and to be reversed upward when the internal pressure of the secondary battery increases due to the excessive charge and discharge of the secondary battery or the abnormal generation of heat by the secondary battery.

In the current intercepting unit 420, a top conductive thin film is formed on the top surface of an insulation printed board and a bottom conductive thin film is formed on the bottom surface of the insulation printed board. The current intercepting unit 420 includes a via hole 430 for connecting the top surface and the bottom surface of the insulation printed board to each other and a conductive layer 460 formed on the internal surface of the via hole 430 to electrically connect the top conductive thin film and the bottom conductive thin film to each other. The current intercepting unit 420 is mounted on the safety vent 410 so that the insulation printed board is broken from the via hole 430 to intercept the current that flows from the safety vent 410 when the protrusion 412 of the safety vent 410 is reversed.

The secondary protective element 480 in the form of a ring having an external diameter corresponding to the external diameter of the safety vent 410 and a predetermined width is settled on and coupled with the top of the current intercepting unit 420 to intercept the flow of current when the temperature of the lithium secondary battery increases. A positive temperature coefficient (PTC) element is preferably used as the secondary protective element 480.

The cap up or cap cover 490 is settled on and coupled with the top of the cap assembly 400 to allow the current generated by the lithium secondary battery to flow to the outside.

Figure 4:
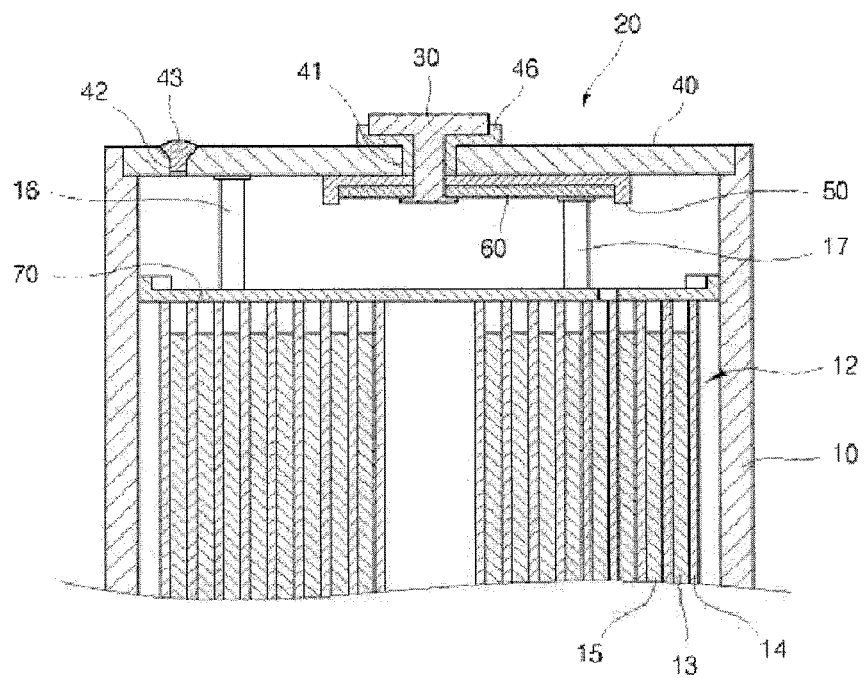
FIG. 4 is a sectional view of a polygon type lithium secondary battery.

FIG. 4 is a sectional view of a polygon type lithium secondary battery that can include either an electrolyte of the first embodiment or an electrolyte according to the second embodiment according to aspects of the present invention.

Referring to FIG. 4, an electrode assembly 12 composed of a positive electrode 13, a negative electrode 15, and a separator 14 is accommodated in a can 10 together with an electrolyte and the top of the can 10 is sealed up by a cap assembly 20 to form the lithium secondary battery. The cap assembly 20 includes a cap plate 40, an insulating plate 50, a terminal plate 60, and an electrode terminal 30. The cap assembly 20 is coupled with an insulating case 70 to seal up the can 10.

The electrode terminal 30 is inserted into a terminal through hole 41 formed in the center of the cap plate 40. When the electrode terminal 30 is inserted into the terminal through hole 41, a tube type gasket 46 is coupled with the external surface of the electrode terminal 30 in order to insulate the electrode terminal 30 and the cap plate 40 from each other so that the tube type gasket 46 is inserted into the terminal through hole 41 together with the electrode terminal 30. After the cap assembly 20 is assembled with the top of the can 10, the electrolyte is injected through an electrolyte injection hole 42 and the electrolyte injection hole 42 is plugged by a plug 43. The electrode terminal 30 is connected to the negative electrode tab 17 of the negative electrode 15 or the positive electrode tab 16 of the positive electrode 13 to serve as a negative terminal or a positive terminal.

The shape of the lithium secondary battery according to aspects of the present invention is not limited to the above-described shapes but may be any shape so long as the lithium secondary battery includes a positive electrode including positive electrode active materials into which lithium ions can be inserted and from which the lithium ions can be separated; a negative electrode including negative electrode active materials into which lithium ions can be inserted and from which the lithium ions can be separated, and either the electrolyte according to the first embodiment or the electrolyte according to the second embodiment.

Hereinafter, examples of the electrolyte according to the first embodiment of the present invention, along with comparative examples, will be described. However, the following examples are examples only, and the present invention is not limited to the specific examples provided.

Example 1

$LiCoO_2$ as a positive electrode active material, polyvinylidene fluoride (PVdF) as a binder, and carbon as a conductive agent were mixed with each other in a weight ratio of 92:4:4 and then, the resultant mixture was dispersed into N-methyl-2-pyrrolidone to manufacture a positive electrode slurry. An Al foil having a thickness of 20 μm was coated with the slurry and then, was dried and rolled to manufacture a positive electrode. Artificial graphite as a negative electrode active material, styrene-butadiene rubber as a binder, and carboxymethylcellulose as a thickener were mixed with each other in a weight ratio of 96:2:2 and then, the resultant mixture was dispersed into water to manufacture a negative electrode active material slurry. A Cu foil having a thickness of 15 μm was coated with the slurry and then, was dried and rolled to manufacture a negative electrode.

A film separator formed of polyethylene (PE) to have a thickness of 20 μm was interposed between the manufactured electrodes and then, the electrodes with the film separator interposed were wound and compressed to be inserted into a cylinder type can. An electrolyte was injected into the cylinder type can to manufacture a lithium secondary battery. $LiPF_6$ of 1.3M was dissolved in an ethylene carbonate/ethylmethyl carbonate/dimethyl carbonate mixed solvent (in a volumetric ratio of 1:1:1) and then, succinic acid anhydride and fluoroethylene carbonate were added to the resultant solution to manufacture the electrolyte. At this time, the amount of the succinic acid anhydride is 0.5 wt % based on the weight of the organic solvent and the amount of the fluoroethylene carbonate was 1 wt % based on the weight of the organic solvent.

Example 2

Example 2 is different from example 1 in that the amount of succinic acid anhydride was 0.5 wt % and the amount of fluoroethylene carbonate was 10 wt %.

Example 3

Example 3 is different from example 1 in that the amount of succinic acid anhydride was 1 wt % and the amount of fluoroethylene carbonate was 3 wt %.

Example 4

Example 4 is different from example 1 in that the amount of succinic acid anhydride was 1 wt % and the amount of fluoroethylene carbonate was 5 wt %.

Example 5

Example 5 is different from example 1 in that the amount of succinic acid anhydride was 1 wt % and the amount of fluoroethylene carbonate was 7 wt %.

Example 6

Example 6 is different from example 1 in that the amount of succinic acid anhydride was 2 wt % and the amount of fluoroethylene carbonate was 3 wt %.

Example 7

Example 7 is different from example 1 in that the amount of succinic acid anhydride was 2 wt % and the amount of fluoroethylene carbonate was 5 wt %.

Comparative Example 1

Comparative example 1 is different from example 1 in that only succinic acid anhydride, in the amount of 3 wt %, was added.

Comparative Example 2

Comparative example 2 is different from example 1 in that only fluoroethylene carbonate, in the amount of 3 wt %, was added.

Comparative Example 3

The comparative example 3 is different from example 1 in that the succinic acid anhydride of 0.1 wt % and the fluoroethylene carbonate of 15 wt % are added.

Comparative Example 4

Comparative example 4 is different from example 1 in that the amount of succinic acid anhydride was 3 wt % and the amount of fluoroethylene carbonate was 0.1 wt %.

Comparative Example 5

Comparative example 5 is different from example 1 in that only vinylene carbonate, in the amount of 3 wt %, was added.

Comparative Example 6

Comparative example 6 is different from example 1 in that vinylene carbonate in the amount of 1 wt % and fluoroethylene carbonate in the amount of 3 wt % were added.

<Standard Capacity>

Standard capacities when the batteries according to examples 1 to 7 and comparative examples 1 to 4 were charged under a 0.5 C/4.2V constant current-constant voltage (CC-CV) condition for three hours are illustrated in Table 1.

<Lives at Room Temperature>

Figure 2A:
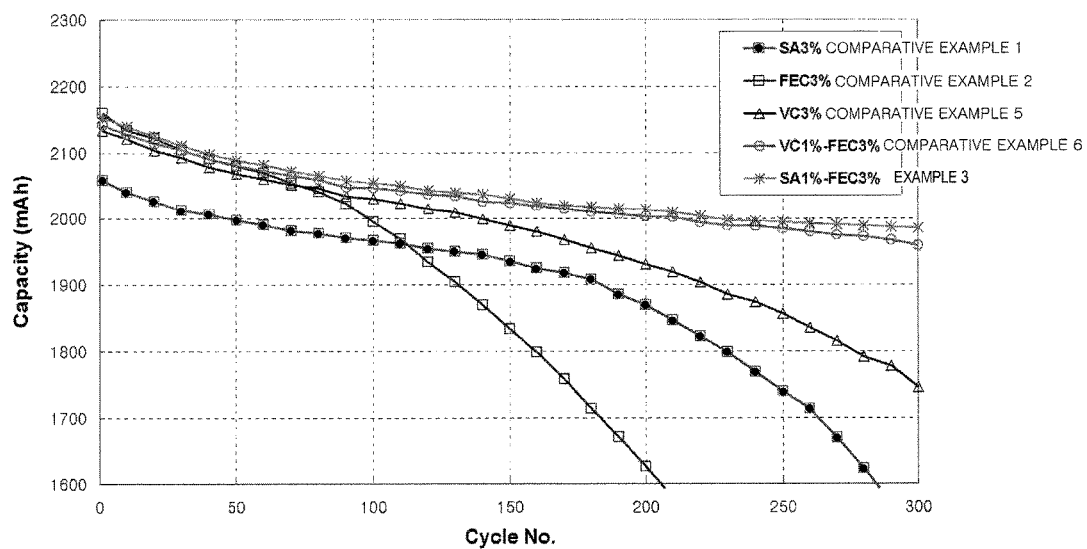
FIGS. 2A and 2B are graphs illustrating room temperature cycle lives of lithium secondary batteries manufactured using electrolytes according to example 3 of the first embodiment of the present invention and comparative examples 1, 2, 5, and 6.
Figure 2B:
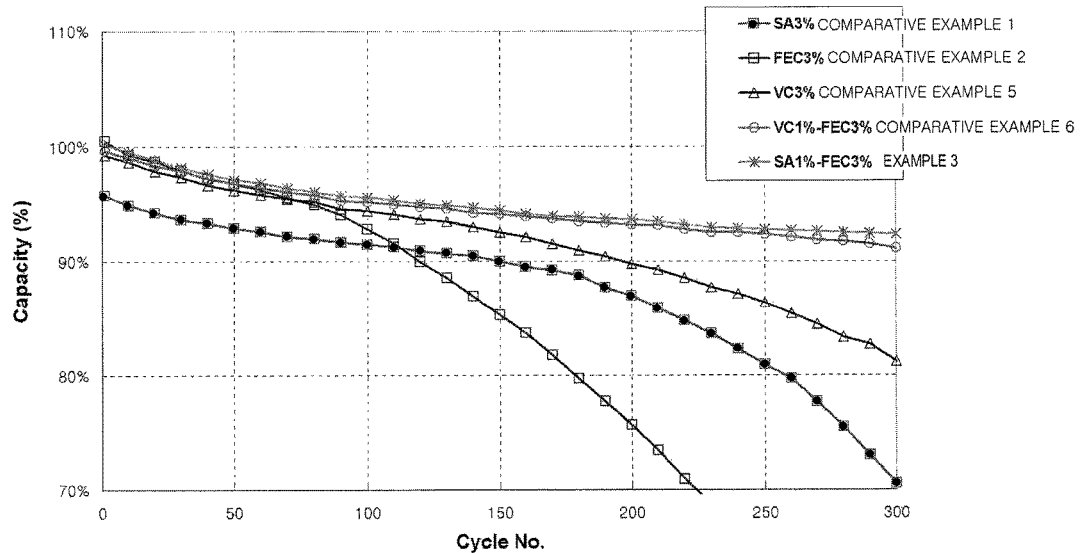

The batteries according to examples 1 to 7 and comparative examples 1 to 6 were charged at a temperature of 25° C. under a 0.5 C/4.2V CC-CV condition for three hours, were discharged under a 1 C CC condition, and were cut off at 3V. After repeating the processes 300 times, the capacity maintaining ratios (%) in the $300^{th}$ cycle at the room temperature were calculated, and the results are illustrated in Tables 1 and 2. Also, graphs of the room temperature cycle lives of the lithium secondary batteries according to example 3 and comparative examples 1, 2, 5, and 6 are illustrated in FIGS. 2A and 2B.

The capacity maintaining ratio (%) in the $300^{th}$ cycle=(the discharge capacity in the $300^{th}$ cycle)/(the discharge capacity in the first cycle)*100(%)

<Lives at High Temperature>

Figure 3:
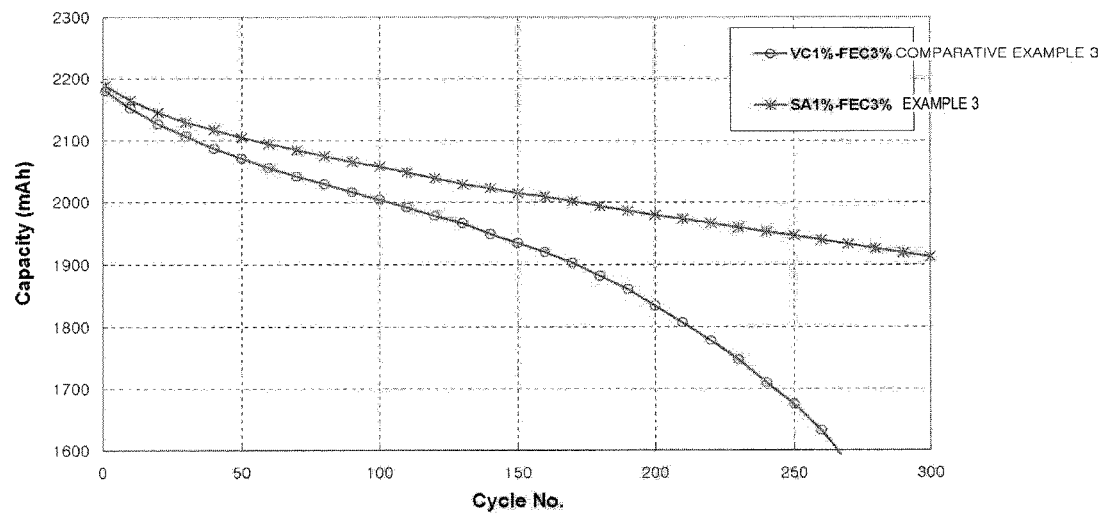
FIG. 3 is a graph illustrating high temperature cycle lives of lithium secondary batteries manufactured using electrolytes according to example 3 of the first embodiment of the present invention and comparative example 3.

The batteries according to example 3 and comparative example 6 were charged at a temperature of 60° C. under a 0.5 C/4.2V CC-CV condition for three hours, wee discharged under a 1 C CC condition, and were cut off at 3V. After repeating the processes 300 times, the capacity maintaining ratios (%) in the $300^{th}$ cycle at the temperature of 60° C. were calculated, and the results are illustrated in Table 2. Also, graphs of the high temperature cycle lives of the lithium secondary batteries according to example 3 and comparative example 3 are illustrated in FIG. 3.

<Preservation at Low Temperature>

The batteries according to examples 1 to 7 and comparative examples 1 to 4 were charged at a temperature of 25° C. under a 0.5 C/4.2V CC-CV condition for three hours, were preserved at a temperature of 0° C. for four hours, were discharged under a 0.5 C CC condition, and were cut off at 3V. After preserving the batteries at the low temperature, the discharge capacity recovery ratios (%) were calculated, and the results are illustrated in Table 1.

The discharge capacity recovery ratio (%) after being preserved at the low temperature=(the 0.5 C discharge capacity after being preserved at the low temperature)/(the 0.5 C discharge capacity before being preserved at the low temperature)*100(%)

<Preservation at High Temperature>

The batteries according to examples 1 to 7 and comparative examples 1 to 4 were charged at a temperature of 25° C. under a 0.5 C/4.2V CC-CV condition for three hours, were preserved at a temperature of 85° C. for 24 hours, were discharged under a 0.5 C CC condition, and were cut off at 3V. After preserving the batteries at the high temperature, the discharge capacity recovery ratios (%) were calculated, and the results are illustrated in Table 1.

The discharge capacity recovery ratio (%) after being preserved at the high temperature=(the 0.5 C discharge capacity after being preserved at the high temperature)/(the 0.5 C discharge capacity before being preserved at the high temperature)*100(%)

SA: succinic acid anhydride, FEC: fluoroethylene carbonate, VC: vinylidene carbonate As noted from Tables 1 and 2, the electrolytes according to examples 1 to 7 that include succinic acid anhydride in the range of from 0.1 wt % to 2 wt % and fluoroethylene carbonate in the range of from 0.1 wt % to 10 wt %, based on the weight of the non-aqueous organic solvent, have long lives and are well preserved. The electrolyte according to the comparative example 1 that includes only succinic acid anhydride, is not well preserved at the low temperature. The electrolyte according to comparative example 2 that includes only the fluoroethylene carbonate does not have a long life. The electrolytes according to comparative examples 3 and 4 that include excessive amounts of succinic acid anhydride or fluoroethylene carbonate are not well preserved at the low or high temperature.

The electrolyte according to the comparative example 6 that includes vinylidene carbonate, instead of the succinic acid anhydride, and fluoroethylene carbonate is preserved as well as the electrolyte according to the example 3 that includes the succinic acid anhydride and the fluoroethylene carbonate at room temperature, but is not as well preserved at the high temperature.

Hereinafter, examples of the electrolyte according to the second embodiment of the present invention, along with comparative examples, will be described. However, the following examples are examples only, and the present invention is not limited to the specific examples provided.

TABLE 1

| | The amount of SA (wt %) | The amount of FEC (wt %) | Standard capacity (%) | Capacity maintaining ratio (%) at room temperature in the 300$^{th}$ cycle | Discharge capacity recovery ratio (%) after preservation at 0° C. for 4 hours | Discharge capacity recovery ratio (%) after preservation at 85° C. for 24 hours |
|---|---|---|---|---|---|---|
| Example 1 | 0.5 | 1 | 100 | | 75 | 96 |
| Example 2 | 0.5 | 10 | 100 | 92 | 50 | 93 |
| Example 3 | 1 | 3 | 100 | 91 | 73 | 96 |
| Example 4 | 1 | 5 | 100 | 91 | 70 | 96 |
| Example 5 | 1 | 7 | 100 | 92 | 68 | 95 |
| Example 6 | 2 | 3 | 99 | 91 | 65 | 95 |
| Example 7 | 2 | 5 | 99 | 92 | 64 | 95 |
| Comparative example 1 | 3 | 0 | 96 | 71 | 20 | 70 |
| Comparative example 2 | 0 | 3 | 100 | 49 | 75 | 96 |
| Comparative example 3 | 0.1 | 15 | 100 | 91 | 40 | 60 |
| Comparative example 4 | 3 | 0.1 | 96 | 72 | 25 | 96 |

TABLE 2

| | The amount of SA (wt %) | The amount of FEC (wt %) | The amount of VC (wt %) | Capacity maintaining ratio (%) at room temperature in the 300$^{th}$ cycle | Capacity maintaining ratio (%) at 60° C. in the 300$^{th}$ cycle |
|---|---|---|---|---|---|
| Comparative example 5 | 0 | 0 | 3 | 91 | — |
| Comparative example 6 | 0 | 3 | 1 | 92 | 60 |
| Example 3 | 1 | 3 | 0 | 91 | 87 |

Example 1a

LiCoO$_2$ as a positive electrode active material, polyvinylidene fluoride (PVdF) as a binder, and carbon as a conductive agent were mixed with each other in a weight ratio of 92:4:4 and then, the resultant mixture was dispersed into N-methyl-2-pyrrolidone to manufacture a positive electrode slurry. An Al foil having a thickness of 20 μm was coated with the slurry and then, was dried and rolled to manufacture a positive electrode. Artificial graphite as a negative electrode active material, styrene-butadiene rubber as a binder, and carboxymethylcellulose as a thickener were mixed with each other in a weight ratio of 96:2:2 and then, the resultant mixture was dispersed into water to manufacture a negative electrode active material slurry. A Cu foil having a thickness of 15 μm was coated with the slurry and then, was dried and rolled to manufacture a negative electrode.

A film separator formed of polyethylene (PE) to have a thickness of 20 μm was interposed between the manufactured electrodes and then, the electrodes with the film separator interposed were wound and compressed to be inserted into a polygon type can. An electrolyte was injected into the polygon type can to manufacture a lithium secondary battery. $LiPF_6$ of 1.15M was dissolved in an ethylene carbonate/ethylmethyl carbonate/dimethyl carbonate mixed solvent (in a volumetric ratio of 1:1:1) and then, diglycolic acid anhydride and fluoroethylene carbonate were added to the resultant solution to manufacture the electrolyte. At this time, the amount of the diglycolic acid anhydride was 0.5 wt % based on the weight of the organic solvent and the amount of the fluoroethylene carbonate was 1 wt % based on the weight of the organic solvent.

Example 2a

Example 2a is different from example 1a in that the amount of diglycolic acid anhydride was 0.5 wt % and the amount of fluoroethylene carbonate was 10 wt %.

Example 3a

Example 3a is different from example 1a in that the amount of diglycolic acid anhydride was 1 wt % and the amount of fluoroethylene carbonate was 3 wt %.

Example 4a

Example 4a is different from example 1a in that the amount of diglycolic acid anhydride was 1 wt % and the amount of fluoroethylene carbonate was 5 wt %.

Example 5a

Example 5a is different from example 1a in that the amount of diglycolic acid anhydride was 1 wt % and the amount of fluoroethylene carbonate was 7 wt %.

Example 6a

Example 6a is different from example 1a in that the amount of diglycolic acid anhydride was 2 wt % and the amount of fluoroethylene carbonate was 3 wt %.

Example 7a

Example 7a is different from example 1a in that the amount of diglycolic acid anhydride was 2 wt % and the amount of fluoroethylene carbonate was 5 wt %.

Comparative Example 1a

Comparative example 1a is different from example 1a in that only diglycolic acid anhydride, in the amount of 3 wt %, was added.

Comparative Example 2a

Comparative example 2a is different from example 1a in that only fluoroethylene carbonate, in the amount of 3 wt %, is added.

Comparative Example 3a

Comparative example 3a is different from example 1a in that the amount of diglycolic acid anhydride was 0.1 wt % and the amount of fluoroethylene carbonate was 15 wt %.

Comparative Example 4a

Comparative example 4a is different from example 1a in that the amount of diglycolic acid anhydride was 3 wt % and the amount of fluoroethylene carbonate was 0.1 wt %.

Comparative Example 5a

Comparative example 5a is different from example 1a in that only vinylene carbonate, in the amount of 3 wt %, was added.

Comparative Example 6a

Comparative example 6a is different from example 1a in that the vinylene carbonate, in the amount of 1 wt % and fluoroethylene carbonate, in the amount of 3 wt %, were added.

<Standard Capacity>

Standard capacities when batteries according to examples 1a to 7a and comparative examples 1a to 4a were charged under a 0.5 C/4.2V constant current-constant voltage (CC-CV) condition for three hours are illustrated in Table 3.

<Lives at Room Temperature>

The batteries according to examples 1a to 7a and comparative examples 1a to 4a were charged at a temperature of 25° C. under a 0.5 C/4.2V CC-CV condition for three hours, were discharged under a 1 C CC condition, and were cut off at 3V. After repeating the processes 300 and 500 times, the capacity maintaining ratios (%) in the $300^{th}$ and $500^{th}$ cycles at room temperature were calculated, and the results are illustrated in Table 3.

Figure 6A:
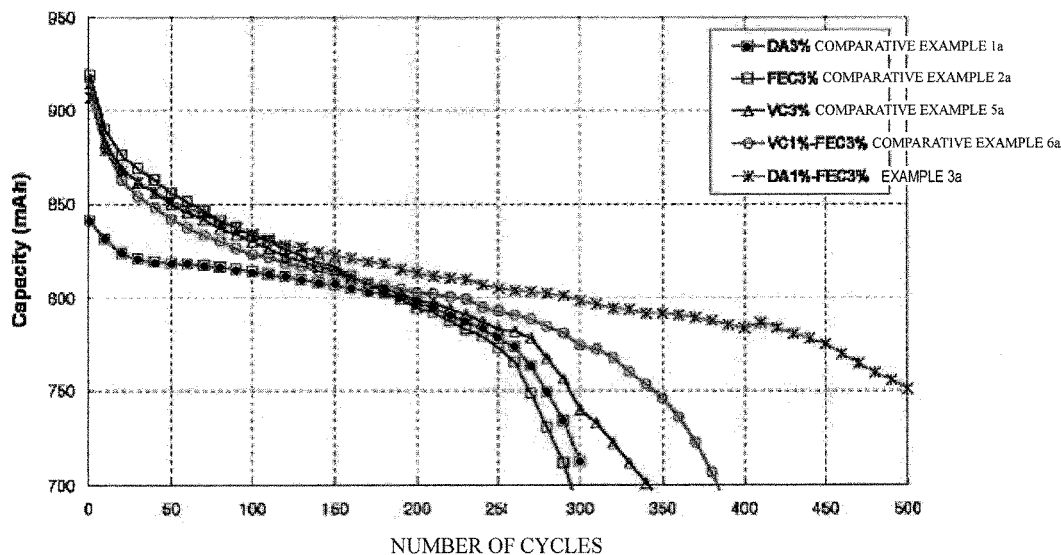
Figure 6B:
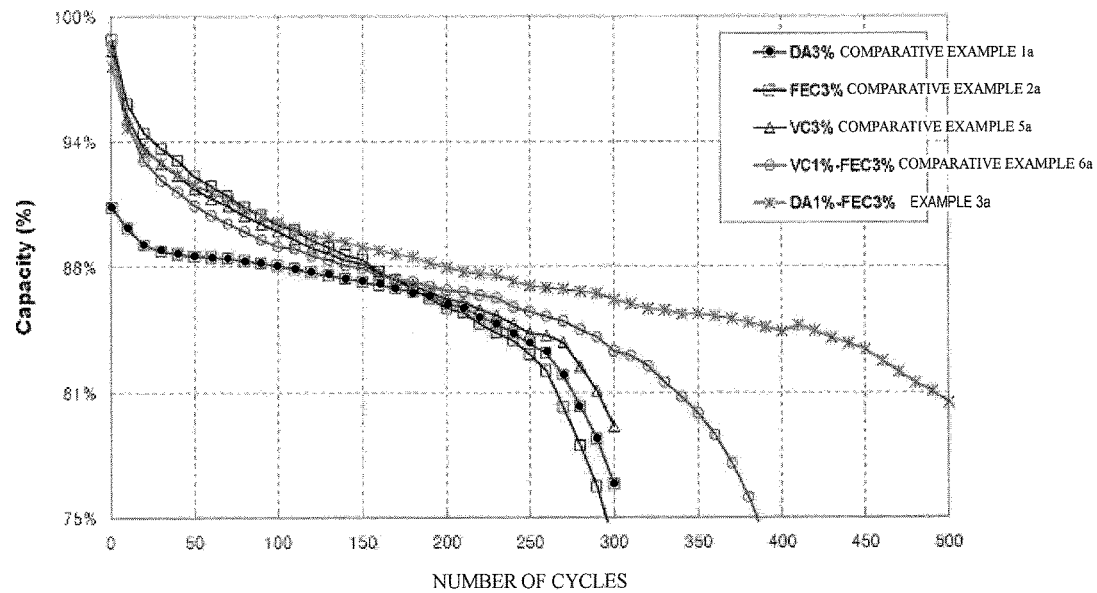

Also, the room temperature cycle lives of the lithium secondary batteries according to example 3a and comparative examples 1a, 2a, 5a, and 6a were measured in the units of ten times to the $500^{th}$ time, and the capacity maintaining ratios thereof were calculated. The results are illustrated in FIG. 5. The measured cycle lives and the calculated capacity maintaining ratios (%) are illustrated in the graphs of FIGS. 6A and 6B.

The capacity maintaining ratio (%) in the nth cycle=(the discharge capacity in the nth cycle)/(the standard capacity 930 mAh of a cell)*100(%)

<Preservation at Low Temperature>

The batteries according to examples 1a to 7a and comparative examples 1a to 4a were charged at a temperature of 25° C. under a 0.5 C/4.2V CC-CV condition for three hours, were preserved at a temperature of 0° C. for four hours, were discharged under a 0.5 C CC condition, and were cut off at 3V. After preserving the batteries at a low temperature, the discharge capacity recovery ratios (%) were calculated, and the results are illustrated in Table 3.

The discharge capacity recovery ratio (%) after being preserved at the low temperature=(the 0.5 C discharge capacity after being preserved at the low temperature)/(the 0.5 C discharge capacity before being preserved at the low temperature)*100(%)

<Preservation at High Temperature>

The batteries according to examples 1a to 7a and comparative examples 1a to 4a were charged at a temperature of 25° C. under a 0.5 C/4.2V CC-CV condition for three hours, were preserved at a temperature of 85° C. for 24 hours, were discharged under a 0.5 C CC condition, and were cut off at 3V. After preserving the batteries at the high temperature, the discharge capacity recovery ratios (%) were calculated, and the results are illustrated in Table 3.

The discharge capacity recovery ratio (%) after being preserved at the high temperature=(the 0.5 C discharge capacity after being preserved at the high temperature)/(the 0.5 C discharge capacity before being preserved at the high temperature)*100(%)

TABLE 3

|  | The amount of DA (wt %) | The amount of FEC (wt %) | Standard capacity (%) | Capacity maintaining ratio (%) at room temperature in the 300$^{th}$ cycle | Capacity maintaining ratio (%) at room temperature in the 500$^{th}$ cycle | Discharge capacity recovery ratio (%) after preservation at 0° C. for 4 hours | Discharge capacity recovery ratio (%) after preservation at 85° C. for 24 hours |
|---|---|---|---|---|---|---|---|
| Example 1a | 0.5 | 1 | 100 | 75 | 55 | 75 | 95 |
| Example 2a | 0.5 | 10 | 100 | 88 | 82 | 50 | 70 |
| Example 3a | 1 | 3 | 100 | 86 | 81 | 73 | 95 |
| Example 4a | 1 | 5 | 100 | 86 | 81 | 70 | 96 |
| Example 5a | 1 | 7 | 100 | 87 | 82 | 68 | 94 |
| Example 6a | 2 | 3 | 98 | 85 | 81 | 65 | 95 |
| Example 7a | 2 | 5 | 98 | 85 | 82 | 64 | 95 |
| Comparative example 1a | 3 | 0 | 96 | 77 | 50 | 20 | 70 |
| Comparative example 2a | 0 | 3 | 100 | 74 | 50 | 75 | 95 |
| Comparative example 3a | 0.1 | 15 | 100 | 87 | 81 | 40 | 61 |
| Comparative example 4a | 3 | 0.1 | 96 | 78 | 51 | 25 | 95 |

DA: diglycolic acid anhydride,
FEC: fluoroethylene carbonate

As noted from Table 3 and FIGS. 6A and 6B, the electrolytes according to the examples 1a to 7a that include diglycolic acid anhydride in the range of from 0.1 wt % to 2 wt % and fluoroethylene carbonate in the range of from 0.1 wt % to 10 wt % based on the weight of the non-aqueous organic solvent have long lives and are well preserved. The electrolyte according to the comparative example 1a that includes only the diglycolic acid anhydride is not well preserved at the low temperature. The electrolyte according to the comparative example 2a that includes only the fluoroethylene carbonate does not have a long life. The electrolytes according to the comparative examples 3a and 4a that include excessive amounts of diglycolic acid anhydride or fluoroethylene carbonate are not well preserved at the low or high temperature and do not have long lives.

The life at room temperature of the electrolyte that includes vinylidene carbonate and fluoroethylene carbonate instead of diglycolic acid anhydride according to the comparative example 6a is much shorter than the life of the electrolyte that includes the diglycolic acid anhydride and the fluoroethylene carbonate according to the example 3a.

As described above, the lithium secondary battery including an electrolyte according to the present invention has a long life and is preserved well.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A lithium secondary battery comprising:
   an electrolyte including a non-aqueous organic solvent, lithium salt, and a dicarboxylic acid anhydride and a halogenated ethylene carbonate as additives, the dicarboxylic acid anhydride being succinic acid anhydride;
   a positive electrode including positive electrode active materials into which lithium ions can be inserted and from which the lithium ions can be separated; and
   a negative electrode including negative electrode active materials into which lithium ions can be inserted and from which the lithium ions can be separated,
   wherein the dicarboxylic acid anhydride is present in an amount of from 0.1 wt % to 2 wt % based on the weight of the non-aqueous organic solvent, and the halogenated ethylene carbonate is present in an amount greater than that of the dicarboxylic acid anhydride and is present in an amount of from 1 wt % to 10 wt % based on the weight of the non-aqueous organic solvent, and
   wherein the halogenated ethylene carbonate is a compound of Chemical Formula 1:

[Chemical Formula 1]

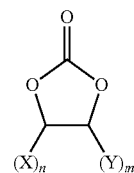

wherein X represents a halogen atom, Y represents a hydrogen or halogen atom, and n and m represent 1 or 2.

2. The lithium secondary battery as claimed in claim 1, wherein the halogenated ethylene carbonate is fluoroethylene carbonate.

3. The lithium secondary battery as claimed in claim 1, wherein the dicarboxylic acid anhydride is present in an amount of from 0.5 wt % to 2 wt % based on the weight of the non-aqueous organic solvent.

4. The lithium secondary battery as claimed in claim 1, wherein the positive electrode active materials are lithium compounds selected from the group consisting of:

$Li_xMn_{1-y}M_yA_2$, $Li_xMn_{1-y}M_yO_{2-z}X_z$, $Li_xMn_2O_{4-z}X_z$, $Li_xMn_{2-y}M_yM'_zA_4$, $Li_xCo_{1-y}M_yA_2$, $Li_xCo_{1-y}M_yO_{2-z}X_z$, $Li_xNi_{1-y}M_yA_2$, $Li_xNi_{1-y}M_yO_{2-z}X_z$, $Li_xNi_{1-y}Co_yO_{2-z}X_z$, $Li_xNi_{1-y-z}Co_yM_zA_\alpha$, $Li_xNi_{1-y-z}Co_yM_zO_{2-\alpha}X_\alpha$, $Li_xNi_{1-y-z}Mn_yM_zA_\alpha$, and $Li_xNi_{1-y-z}Mn_yM_zO_{2-\alpha}X_\alpha$, wherein, $0.9 \leq x \leq 1.1$, $0 \leq y \leq 0.5$, $0 \leq z \leq 0.5$, and $0 \leq \alpha \leq 2$, M and M' are equal to each other or different from each other and are selected from the group consisting of Mg, Al, Co, K, Na, Ca, Si, Ti, Sn, V, Ge, Ga, B, As, Zr, Mn, Cr, Fe, Sr, V, and rare earth elements, A is selected from the group consisting of O, F, S, and P, and X is selected from the group consisting of F, S, and P.

5. The lithium secondary battery as claimed in claim 1, wherein the negative electrode active materials are selected from the group consisting of crystalline carbon, amorphous carbon, a carbon composite, carbon fiber, a lithium metal, and a lithium alloy.

6. The lithium secondary battery of claim 1, wherein the lithium secondary battery is a cylindrical type or a polygon type.

7. An electrolyte for a lithium secondary battery comprising:
a non-aqueous organic solvent;
a lithium salt; and
diglycolic acid anhydride and a halogenated ethylene carbonate as additives, wherein the diglycolic acid anhydride is substituted by at least one substituent selected from the group consisting of halogen, an alkyl group including from 1 to 10 carbon atoms, an alkene group, and an acyl group,
wherein the halogenated ethylene carbonate is a compound of Chemical Formula 1:

[Chemical Formula 1]

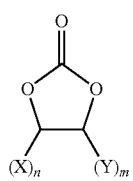

wherein X represents a halogen atom, Y represents a hydrogen or halogen atom, and n and m represent 1 or 2.

8. The electrolyte as claimed in claim 7, wherein the substituted or unsubstituted diglycolic acid anhydride is present in an amount of from 0.1 wt % to 2 wt % based on the weight of the non-aqueous organic solvent.

9. The electrolyte as claimed in claim 7, wherein the halogenated ethylene carbonate is present in an amount of from 0.1 wt % to 10 wt % based on the weight of the non-aqueous organic solvent.

10. The electrolyte as claimed in claim 7, wherein the halogenated ethylene carbonate is fluoroethylene carbonate.

11. The electrolyte as claimed in claim 7, wherein the non-aqueous organic solvent is at least one selected from the group consisting of carbonate, ester, ether, and ketone.

12. The electrolyte as claimed in claim 11, wherein the carbonate is a mixture of a cyclic carbonate and a chain carbonate.

13. The electrolyte as claimed in claim 12, wherein the cyclic carbonate is at least one selected from the group consisting of ethylene carbonate, propylene carbonate, 1,2-butylene carbonate, 2,3-butylene carbonate, 1,2-pentylene carbonate, and 2,3-pentylene carbonate.

14. The electrolyte as claimed in claim 12, wherein the chain carbonate is at least one selected from the group consisting of dimethyl carbonate, diethyl carbonate, dipropyl carbonate, methylpropyl carbonate, ethylmethyl carbonate, and ethylpropyl carbonate.

15. The electrolyte as claimed in claim 7, wherein the non-aqueous organic solvent is a mixture of a carbonate-based solvent and an aromatic hydrocarbon-based organic solvent.

16. The electrolyte as claimed in claim 15, wherein the aromatic hydrocarbon-based organic solvent is an aromatic compound of Chemical Formula 2,

[Chemical Formula 2]

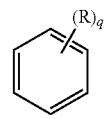

wherein, R represents halogen or an alkyl group including from 1 to 10 carbon atoms and q represents an integer from 0 to 6.

17. The electrolyte as claimed in claim 16, wherein the aromatic hydrocarbon-based organic solvent is at least one selected from the group consisting of benzene, fluorobenzene, chlorobenzene, bromobenzene, toluene, xylene, mesitylene, and mixtures thereof.

18. The electrolyte as claimed in claim 15, wherein the carbonate-based solvent and the aromatic hydrocarbon-based organic solvent are mixed with each other in a volumetric ratio in the range of from 1:1 to 30:1.

19. The electrolyte as claimed in claim 7, wherein the lithium salt is at least one or two selected from the group consisting of $LiPF_6$, $LiBF_4$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlO_4$, $LiAlCl_4$, $LiCl$, and $LiI$.

20. A lithium secondary battery comprising:
the electrolyte as claimed in claim 7;
a positive electrode including positive electrode active materials into which lithium ions can be inserted and from which the lithium ions can be separated; and
a negative electrode including negative electrode active materials into which lithium ions can be inserted and from which the lithium ions can be separated.

21. The lithium secondary battery of claim 20, wherein the lithium secondary battery is a cylindrical type or a polygon type.

* * * * *